United States Patent [19]

McQuarrie

[11] 4,252,696
[45] Feb. 24, 1981

[54] HIGH-SPEED PULTRUSION POLYESTER RESINS AND PROCESS

[75] Inventor: Terry S. McQuarrie, San Jose, Calif.

[73] Assignee: Koppers Company, Inc., Pittsburgh, Pa.

[21] Appl. No.: 19,306

[22] Filed: Mar. 12, 1979

Related U.S. Application Data

[63] Continuation of Ser. No. 798,128, May 18, 1977, abandoned.

[51] Int. Cl.$^3$ ............................................. C08L 1/14
[52] U.S. Cl. ................................. 260/16; 264/137; 264/331
[58] Field of Search ................... 260/16; 264/137, 331

[56] References Cited

U.S. PATENT DOCUMENTS

| | | | |
|---|---|---|---|
| 3,642,672 | 2/1972 | Kroekel | 260/16 |
| 3,711,432 | 1/1973 | Shah | 260/16 |
| 3,859,409 | 1/1975 | Coonrod | 264/137 |
| 3,862,064 | 1/1975 | Fry | 260/16 |
| 3,878,137 | 4/1975 | Hess et al. | 260/16 |
| 3,895,896 | 7/1975 | White et al. | 264/137 |
| 3,940,350 | 2/1976 | Hess | 260/16 |
| 3,972,977 | 8/1976 | Fry | 264/331 |
| 3,989,655 | 11/1976 | Rudolph et al. | 260/16 |
| 3,997,627 | 12/1976 | Ichimura et al. | 260/16 |

FOREIGN PATENT DOCUMENTS 936351  9/1963  United Kingdom .

OTHER PUBLICATIONS

Mid-Annual Technical Conf., 1978, Reinforced Plastics/Composites Institute-The Society of the Plastics Industry, Inc., McQuarrie, "New Generation Resins for Pulstrusion".

*Primary Examiner*—Edward M. Woodberry
*Attorney, Agent, or Firm*—Herbert J. Zeh, Jr.; Oscar B. Brumback

[57] ABSTRACT

The speed of pultrusion can be increased and the quantity of pultruded products can be improved by using a polyester resin composition containing 4-10 parts of certain cellulose acetate butyrate resins per 100 parts of polyester resin.

5 Claims, No Drawings

HIGH-SPEED PULTRUSION POLYESTER RESINS AND PROCESS

This is a continuation of application Ser. No. 798,128, filed May 18, 1977, now abandoned.

BACKGROUND OF THE INVENTION

This invention relates generally to a process for producing reinforced polyester products employing a pultrusion process and to polyester resin compositions used therein. More particularly, it is directed to a pultrusion process that is run at significantly greater pulling or running speeds, and to particular new polyester resin compositions that make possible the use of such higher speeds.

Pultrusion is a newer process of producing reinforced plastic products than are molding or hand-lay-up methods having its origin in the fifties. Generally, the term "pultrusion" is used to describe any process of producing reinforced plastics in which continuous reinforcing material is impregnated with resin and pulled through a die of desired cross section to shape and cure the resin and produce continuous lengths of cured product having a uniform cross section and the shape of the die. Thermosetting-type resins are used almost exclusively at the present time with polyester resins comprising 85 to 90 percent of the total and epoxies the rest.

In pultrusion, the reinforcing material may be any filamentary material having strength, such as glass fiber, Aramid fibers, boron fibers or graphite fibers. Cusomarily, E-glass fibers constitute the majority of reinforcing material used. Most commonly, filamentary reinforcing materials are used in the forms of: rovings, tows, mats, or cloth, or combinations of these forms.

Because pultrusion incorporates continuous strands of reinforcing material, it produces a product much stronger and flexible than those produced by older extrusion processes, which can only utilize discontinuous lengths of reinforcing filament material. Because of these characteristics, whenever high-strength products having the customary properties of polyester resins are desired, such as corrosion resistance, electrical resistance or lightweight, then pultrusion will be used. The sizes and shapes of products, either solid or hollow, produced by pultrusion is virtually unlimited, as for example, I-beams, channel, wide-flange beams, solid bars and rods, round and square tubing, rectangular beams, angles, and even flat sheets. Customarily, the thickness of these parts can range from as little as ⅛ inch up to a practical maximum of about three inches.

Initially, pultrusion did not grow rapidly because it was costly and was limited to products with small cross-sectional areas. During the 1950's, however, radio frequency (RF) preheating was developed, which permitted faster line speeds and larger cross-sectional products to be made. However, even with RF-augmented heating, there is a practical limit to pultrusion speed beyond which pultruded parts exhibit either internal thermocracking due to excessive exotherm or external or internal cracking due to undercuring and monomer gassing. Typically, products having a thickness of about 0.25–0.375 inch made with relatively fast-curing polyester resins can be pultruded at a maximum speed of about 8 to 9 feet per minute with fairly smooth surfaces; products having a thickness of about 0.375 to 0.675 inch made with an intermediate reactivity resin can be pultruded at speeds up to 6 feet per minute with only mildly abraded surfaces; while thick products over 0.67 inches in thickness and made with medium reactivity resins are limited to speeds of about 0.5–5 feet maximum depending on thickness and have pronounced surface abrasion and roughness. Additionally, because of the thermal cracking that occurs when the curing exotherm is excessive, thick parts generally can only be made with medium reactivity resins having a maximum degree of unsaturation of about 50 to 55 mole percent of the total diacids (100 mole percent) employed in producing the resin. Because of their limited reactivity, these resins tend to give softer cured surfaces that are more prone to be abraded in the die and to give products having rough, uneven surfaces.

SUMMARY OF THE INVENTION

Accordingly, it is an object of the present invention to provide new polyester resin composition for pultrusion which either do not have or have to a lesser degree the deficiencies of presently-used polyester resins. More particularly, it an object of this invention to provide polyester resin compositions that can be pultruded more rapidly, thus making possible higher-productivity pultrusion processes.

A further object is the provision of pultrusion polyester resins that not only pultrude faster but also give pultruded products having smoother surfaces and diminished occurrence of internal and/or external cracks.

These and other objects and advantages, which will become apparent from the following description and claims, are obtained with polyester resin compositions containing 4–10 parts of particular cellulose acetate butyrate resins per 100 parts of particular polyester resins, as hereinafter more fully described. Such compositions can be pultruded at greater speeds to give products having diminished surface roughness and internal and/or external cracking. Additionally certain of these compositions have been found to give bulk or sheet molding compositions capable of producing thick moldings that are crack-free.

DESCRIPTION OF THE PREFERRED EMBODIMENTS

In the following description and claims:
(a) All parts, phr (parts per hundred of resin), and percentages are calculated and expressed on a weight basis;
(b) The term "polyester" refers to a polymerizable unsaturated alkyd resin formed by the condensation of diacid(s) and glycol(s) hereinafter described;
(c) The term "polyester resin" refers to a stable homogeneous solution of the polyester and monomer(s), hereinafter described, copolymerizable with the polyester; and
(d) The term "pultrusion (or invention) polyester resin" refers to a stable homogeneous solution formed by dissolving into the polyester resin a cellulose acetate butyrate resin useful in the invention process, as hereinafter described.

Polyesters employed in the invention polyester resins are the condensation products of one or more dicarboxylic acids and/or anhydrides (100 moles %) with a slight excess of one or more glycols (about 105–110 mole %), chosen to provide a polyester, which, when combined with the vinyl monomers, hereinafter described, and cured, give a Barcol hardness of about 45 or greater, as determined by ASTM test method, D 2583-75 employing a 0.125 inch-thick cured clear casting. For the polyester to provide this hardness and the reactivity necessary for the invention process, at least about 60 mole percent of the total dicarboxylic acids (and/or anhydrides) used to make the resin should be of the alpha, beta-unsaturated type, copolymerizable with the vinyl monomers. In some instances when high reactivity is desired, as for example when the polyester resin is to be utilized with a large quantity of the CAB resin, 90-100 mole percent of the dicarboxylic acids employed will be alpha, beta-unsaturated. More typical, however, are polyesters made with about 65 to 85 mole percent unsaturation, with about 75-80 mole percent being optimium.

Examples of alpha, beta-unsaturated acids that can be employed to provide this unsaturation are: maleic, fumaric, chloromaleic, itaconic, and like acids and/or anhydrides. The balance of any diacids or anhydrides employed to modify the reactivity and properties of the polyester may be either saturated or of the non-alpha, beta-unsaturated type, and may be, for example, phthalic, isophthalic, tetrahydrophthalic or tetrachlorophthalic acid, hexachloroendomethylenetetrahydrophthalic acid or low-molecular-weight aliphatic dicarboxylic acids, such as succinic, adiptic or diglycolic acid, or their anhydrides. As previously described, the degree of alpha, beta-unsaturation and, hence, reactivity of the polyester and the modifying diacids should be chosen so as to give a polyester resin having the desired Barcol hardness. In this connection, it is known that the alphatic diacids tend to impart softness and, therefore, must be used in minor amounts. Conversely, it is known that the aromatic diacids, such as the phthalic or the halophthalic acids, impart hardness and can be used in larger quantities. When fire retardancy is desired, a halogenated diacid, such as tetrachlorophthalic acid or anhydride is used, or a non-alpha, beta-unsaturated acid, such as tetrahydrophthalic acid is used and then halogenated after condensation.

Examples of suitable glycols that may be used are ethylene glycol, propylene glycol, 1,4-butane diol, neopentyl glycol, 2,2-bis-(4-hydroxycyclohexyl)-propane) and the adduct of two moles of propylene oxide with bisphenol A. Polyether glycols, such as diethylene glycol and dipropylene glycol also may be utilized but only in small quantities, because of their softening effect on the polyester after cure. Similarly, it may be necessary to limit the quantity of ethylene glycol in the polyester when the resin is to be dissolved in large quantities of monomer, as for example 55 to 60 percent monomer, since ethylene glycol lowers the monomer solubility of the polyester.

The molecular weight of the invention polyester is not narrowly critical and varies typically between about 1500 and 3500 with an acid number in the range of about 20 to 35.

Lastly, in the invention polyester resin, either a single polyester may be employed or a mixture of two or more polyesters may be employed such that, after mixing, the combined total of the diacids and glycols present in each will give a final polyester resin system having the desired Barcol hardness and reactivity. An example of such a mixture is shown in Example 1. Generally, such mixtures have the same physical properties as a single polyester made with the same total quantity and types of condensation reactants used to make the two separate polyesters. The expression "polyester" used in the claims is intended to cover such mixtures.

Polyesters giving especially high pultrusion speeds and pultruded products with minimal or no surface abrading or internal or external cracks, and hence constituting one of the preferred embodiments of the pultrusion polyester resins of this invention, are those having a sytrene compatibility of about 25% or less and an alpha, beta-unsaturation (—C=C—) equivalent weight of about 200 to 275. Such polyesters are typically made by the condensation of about 65 to 85 mole percent of a suitable alpha, beta-unsaturated diacid (usually maleic) and 15-35 mole percent of a suitable modifing diacid with a slight excess (e.g. 105-110 mole percent) of suitable glycol(s)—the condensation reactants being chosen to provide the polyester with this degree of styrene compatibility. The definition and method of determining "styrene compatibility" is given in U.S. Pat. No. 3,940,350, column 4, lines 3-50, which is incorporated herein by reference for this disclosure.

In addition, pultrusion polyester resins made with polyesters having this degree of styrene compatibility and (—C=C—) equivalent weight have been discovered to give bulk and sheet molding compounds capable of being molded in thick sections (0.67 inch and greater) without cracking.

The monomers used in the invention polyester resin are, most preferably, styrene or vinyl toluene or mixtures of the two employed in a quantity of about 45 to 55 weight percent of the total weight of the polyester resin. In certain instances, as little as 40 percent or as much as 60 percent monomer may be employed. However, when less than about 45 percent monomer is used, low-molecular-weight cellulose acetate butyrates, such as EAB 551-0.01, may be required to give acceptably low resin viscosity. Alternatively, such low-monomer resins may be heated in the impregnation tank to reduce viscosity to an acceptable level. This of course, may require using catalysts having higher activation temperatures to prevent premature gellation. Conversely, more than about 55 percent monomer is usually only employed when physical properties are not especially critical and lower cost is paramount. Typically, physical properties are maintained at high levels up to about 55 percent, at which point they start to drop.

Generally, the quantity of monomer is determined by the viscosity requirement of the intended pultrusion process, taking into consideration the type and molecular weight of the polyester and cellulose acetate butyrate being employed in the system—viscosity decreasing with increasing monomer. In this connection, when the pultrusion composition is to be used for impregnating roving or tows, viscosities in the range of 800 to 1500 centiposes (cpss) may be employed, with viscosities of 900 to 1000 cps generally being preferred. With mat or fabric reinforcement, typical viscosities are of the order of about 1500 to 2000 cps. Bearing in mind that the impregnating polyester resin formulation can be compounded with varying amounts of filler, it can be appreciated that the raw or neat polyester resin may typically be made to have a viscosity ranging from about 500 to 2000 cps depending upon the type and quantity of filler subsequently added.

When other monomers are used to partially replace styrene and/or vinyl toluene in the invention polyester resin, the type and quantity chosen should be such that they give a polyester resin having a length to peak exotherm (LPE) not in excess of about 90 seconds when the resin is catalyzed with 2 percent Percadox 16 (98 percent active bis-4-t-butyl cyclohexyl peroxydicarbonate) and tested for reactivity in accordance with the Society of the Plastic Industry (SPI) gel-time test. When very high reactivity resins are desired, the LPE should not exceed about 70 seconds. Illustrative of other monomers that may be employed are: divinyl benzene, for increased cured resin hardness; vinyl acetate, for lower resin viscosity, and acrylate esters, for improved light stability. Other monomers that might be considered for inclusion in the polyester resin are, for example, alpha-methylstyrene, chlorostyrene, diallylphthalate, and triallyphosphate. In addition to providing a polyester resin having the aforedescribed reactivity (LPE), any replacement monomers chosen should have in combination with the styrene and/or vinyl toluene an acceptable degree of solvating properties for the polyester.

The invention pultrusion polyester resin contains, per 100 parts of the resin, 4 to 10 parts of a cellulose acetate butyrate resin (CAB) that is soluble in the polyester resin to give a stable one-phase solution, which, when cured in the neat form at a thickness of 0.125 inches, has a heterogeneous opaque appearance. CAB resins having these properties typically have an average butyrate content of about 44 percent or greater and an average hydroxyl content of about 0.9 to 2.0 percent. Best results have been obtained with CAB resins having a butyrate content of about 49 to 55 percent by weight. Further, to obtain pultrusion polyester resins that are not excessively viscous, it is preferred to employ CAB's having a viscosity not exceeding about 5 seconds, as determined by ASTM test method, D 817-65 (Formula A), and D 1343-56. Most preferred are CAB resins having a viscosity of one second or less. Cellulose acetate butyrate resins having these characteristics are available from Eastman Kodak under the following designations: CAB-551-0.01, -0.1, -0.1, -0.2 and -1; CAB-500-5; and CAB-451-1. If desired, mixtures of suitable CAB resins may be used. Also, there could be used, if available, cellulose acetate pentoate or cellulose acetate hexoate resins having the aforedescribed solubility and cured-compatibility characteristics in the polyester resin.

When less than about four parts of CAB resin are employed, pultruded products exhibit internal cracking and/or surface abrasion, while more than ten parts of CAB can give viscosities too high for satisfactory pultrusion. Too-high viscosities require the use of monomers in quantities greater than about 60 percent where, as previously described, physical properties are diminished. Most preferred are pultrusion polyester resins containing 5-8 phr of the CAB resin.

Typically, the amount of CAB resin added is adjusted to the reactivity of the polyester resin being employed in the pultrusion invention compositions. For example, a polyester having high reactivity (i.e., one made with 95 to 100 mole percent of unsaturated acid) usually requires about 7 to 10 parts of CAB; a fairly high-reactivity resin (i.e., one made with about 75 mole percent of unsaturated acid), about 5 to 8 parts of CAB; a polyester of intermediate reactivity (i.e., one made with about 67 mole percent of unsaturated acid), about 5 to 6 parts of CAB; while a low-reactivity polyester (i.e., one made with about 60 percent of unsaturated acid), about 4 to 5 parts of CAB. Generally, the higher the unsaturated content of the polyester, the greater the cross-linking density and the peak exotherm temperature, and, hence the shrinkage of the polyester upon cure. Both factors contribute to gross internal stresses, which result in internal cracking, and, hence, proportionally increasing amounts of CAB are required as the resin reactivity increases to alleviate these effects.

The invention polyester resins utilized in the pultrusion invention process are easily prepared by dissolving the cellulose acetate butyrate resin in the polyester resin, by means known to those skilled in the art and then adding additional monomer, if required, to give the specification viscosity desired. Alternatively, some of the monomer may be withheld from the polyester resin to predissolve the CAB resin, with the resulting CAB solution then being admixed with the polyester resin and the viscosity adjusted with additional monomer. If desired, solvation of the CAB resin can be accelerated by heating the polyester resin or monomer to moderately elevated temperatures, such as 50° to 60° C.

The invention pultrusion polyester resins are compounded into the final pultrusion compositions used to impregnate the reinforcing material by usual means and utilize the kinds and quantities of ingredients and adjuvants typically used for polyester resins in this process.

Thus, the level of catalyst chosen is such that the pultrusion polyester resin will be substantially fully cured during its residence time in the pultrusion die, and typically will be about 0.75 to 1.25 phr, with about 1 phr most commonly being employed. Preferred are catalysts having a critical temperature (or activation temperature) of about 120°–145° F., such as Percadox 16 (98 percent active bis-4-t-butylcyclohexyl peroxydicarbonate having a critical temperature of about 120° to 122° F.) or Catalyst USP-245 (5-dimethylhexane-2,5-diper 2-ethylhexoate having a critical temperature of about 145° F.). Catalysts having this range of activation temperatures allow the pultrusion compound to be cured at lower temperatures which permits higher pultrusion speeds and minimizes internal thermal cracking. Catalysts having higher critical temperatures, however, may at times be used to advantage with RF-augmented heating to give high pultrusion speeds, but generally are less preferred because of the necessity of heating the resin-impregnated reinforcement to a temperature within 40° to 50° F. of the critical temperature of the catalyst. For example, temperatures of 110° to 120° F. may be needed when benzoyl peroxide having a critical temperature of 160° F. is used. At these higher temperatures, monomer vaporization increases, changing the desired ratio of polyester to monomer in the resin system. Additionally, increased monomer vapor in the air constitutes possible health and fire hazards to people working in the vicinity of the pultrusion machine. Particularly, fire caused by sparking of the radio frequency heating equipment can be a threat that must be guarded against.

Besides benzoyl peroxide, other catalysts having high critical temperatures, such as t-butyl perbenzoate having a critical temperature of about 200° F., may be utilized, particularly in combination with catalysts having low activation temperatures. Such combinations may be advantageous when higher curing exotherms are required, as for example, when higher running speeds are to be utilized. Generally, undercuring due to insufficient catalyst results in monomer gassing causing internal voids and/or surface hairline cracks running for various lengths through the length of the pultrusion. When observed, increasing the level of catalyst will increase the degree of cure and eliminate these defects.

The kinds and quantities of other ingredients used in the pultrusion compositions of the invention are conventional and like those used in standard pultrusion compounds. Thus, fillers, such as calcium carbonate, clay and hydrated alumina, may be utilized in quantities varying from 0 to 100 phr of the pultrusion polyester resin, with the quantity being dictated primarily by the viscosity of the initial pultrusion polyester resin and the final viscosity required of the pultrusion composition for the intended use. Bearing this in mind, typically about 0 to 25 phr filler will be employed for tows and roving to give the desired 800–1500 cps impregnation viscosity while about 10 to 100 phr filler will be required for mat and fabric pultrusion compositions to give the desired 1500–2000 cps final viscosity. In addition to adjusting viscosity, the use of fillers also reduces cost and further lowers cure shrinkage of the pultrusion composition.

Similarly, inhibiters also are present in the invention resin compositions to prevent premature gelation of the resin during manufacture and storage and subsequently during utilization in the pultrusion process. Illustrative of useful inhibiters utilized in quantities giving the desired gel time according to standard industry practices are: hydroquinone, t-butyl catechol, and di-t-butyl-p-creosol. Other inhibiters, either individually or in combination, may alternatively be employed so long as the kinds and quantities are judiciously chosen to provide the desired SPI gel time, previously described in connection with the monomers.

Lastly, the pultrusion compositions typically utilize standard mold release agents in quantities (1–5 phr) promoting smooth extrusion and minimal die sticking. Exemplary of materials that may be used are: calcium or zinc sterate, phosphate esters or very fine (1 micron) polyethylene powder.

In the invention process, any type of reinforcement may be utilized that is customarily employed in standard pultrusion processes and includes filamentary reinforcements in the form of rovings, tows, mats, woven cloth and the like, either singly or in various combinations. Glass fiber constitutes the majority of reinforcement material used today and will be normally employed in the invention process. When special properties, such as higher strengths or lower weights, are desired, more esoteric reinforcements, such as Aramid, boron or graphite fibers may be used in any of the forms previously described. Conventionally, flat sheets are pultruded with mats or woven cloths—often reinforced with longitudinal lengths of fiber or roving—in quantities representing about 25 to 60 percent of the pultruded product, with about 50 percent being most typical. Other shapes, such as bars, rods, beams, and the like usually employ rovings or tows in quantities constituting about 65 to 75 percent of total product weight, with 70 percent being most typical. When maximum adhesion between fiber reinforcement and pultrusion polyester resin is desired, chemical coupling agents are applied to the reinforcing material.

Similarly the invention pultrusion polyester resin is pultruded in a manner like the polyester of the prior art except for the pulling speed which can be two to four times more rapid than the speeds used for polyesters of the prior art. Ideally, pultrusion compounds employing the invention polyester resins are pultruded through a heated die, usually 3–5 feet long, arbitrarily divided for temperature sensing and control purposes into 4 zones. A typical die temperature profile for pultruding a compound like that used in Example 1 is shown in Table A, which shows the temperature used as the pultruding speed is increased.

As can be seen from Table A, the initial set point for the control probe in Zone I should be 325° F. Zone II can go up to 340° F. and Zone III to 400° F. Zone IV should be greater than 250° F. before processing begins. As line speed increases and the heat from the exotherm raises the die heat, the control temperature in Zone I is incrementally lowered so as to keep Zone IV greater than 300° F., preferably 325° F. An indication of too low die heat will be the presence of internal voids. This is easily remedied by increasing the control temperature 10°–20° F. or lowering the radio frequency plate current so as to reduce the resin temperature 5°–10° F. The speed and heat profiles shown in Table A are for R.F.-augmented-cure pultrusion equipment, but are equally applicable to thermal-only equipment, but at somewhat lower speeds.

TABLE A

| Pultrusion Speed (ft/min) | Rosin Temperature (°F.) | Zone Die Temperatures (°F.) | | | |
|---|---|---|---|---|---|
| | | Zone I | Zone II | Zone III | Zone IV* |
| 1 | 75 | 325–225* | 325 | 335 | 315 |
| 2 | 90 | 235 | 320 | 370 | 315 |
| 3 | 95 | 235 | 320 | 375 | 335 |
| 4 | 100–105 | 240 | 315 | 375 | 330–345 |
| 5 | 105–115 | 265 | 340 | 400 | 340 |
| 6 | 110–115 | 265 | 335 | 400 | 335 |

*Control temperature is lowered from 325 to 225° F. as line speed increases in order to maintain "heat profile."

EXAMPLE 1

A polyester resin was made by admixing together:

| | |
|---|---|
| Polyester A | 20.9% |
| Polyester B | 23.8% |
| Styrene | 55.3% |
| Total | 100.0% |

Polyester A and polyester B and the mixture of the two comprised:

| | Polyester A | Polyester B | Mixture |
|---|---|---|---|
| maleic anhydride (moles) | 0.5 | 1.0 | 0.765 |
| isophthalic acid (moles) | 0.5 | | 0.235 |
| propylene glycol (moles) | 1.05 | 1.11 | 1.085 |
| Properties | | | |
| Styrene Compatibility | 10% | 40% | 25% |
| LPE (2% Percadox 16) | | | 57 sec. |
| (-c = c-)equivalent weight | 370 | 160 | 225 |
| Cured Barcol hardness | 45 | 60 | 55 |
| viscosity | | | 500 cps |

A pultrusion polyester resin was then prepared by admixing and dissolving into 100 parts of the polyester resin, 5.7 parts of Eastman Kodak's CAB-551-0.1 resin (cellulose acetate butyrate resin having about 55% butyrl, 2% acetyl and 1.6% hydroxyl average content). Finally, a pultrusion composition having a viscosity of 1000 cps was prepared by homogeneously admixing:

|  | Parts |
|---|---|
| pultrusion polyester resin | 105.7 |
| mold release agent (phosphate ester) | 1.06 |
| catalyst USP-245 | 1.06 |
| calcium carbonate filler | 10.6 |

This compound was used to impregnate 66-end-count glass roving that was subsequently pulled through a die producing a flat bar, 1½ inch × ¼ inch having ribbed edges, utilizing the processing conditions shown in Table 1.

TABLE 1

| Pulling Speed (ft/min) | RF Heating of Impregnated Roving | Die Temperature (°F.) | | | Comments |
|---|---|---|---|---|---|
| | | Entrance Zone | Middle Zone | Exit Zone | |
| 2.0 | no | 245 | 265 | 255 | Good Surface, No Cracks |
| 2.5 | no | 245 | 265 | 255 | " |
| 3.0 | no | 245 | 265 | 255 | " |
| 3.5 | no | 202 | 257 | 277 | " |
| 4.0 | no | 202 | 257 | 277 | " |
| 5.0 | no | 202 | 257 | 277 | " |
| 6.0 | yes | 168 | 235 | 280 | Some surface abrading |
| 6.5 | yes | 175 | 235 | 280 | Some surface abrading and cracking at corner |

EXAMPLE 2

A pultrusion polyester resin having a viscosity of 1000 cps was prepared by admixing and dissolving together first:

|  | Parts |
|---|---|
| Polyester of Example 1 | 47.6 |
| Styrene | 52.4 |
| CAB-551-0.1 | 7.85 | and then admixing into the resulting solution:

|  | Parts |
|---|---|
| mold release agent | 1.08 |
| catalyst USP-245 | 1.08 |

The resulting pultrusion composition was used to impregnate a 68-end-count glass roving that was pulled through the same die as used in Example 1 utilizing the processing conditions shown in Table 2.

TABLE 2

| Pulling Speed (ft/min) | RF Heating of Impregnated Roving | Die Temperature (°F.) | | | Comments |
|---|---|---|---|---|---|
| | | Entrance Zone | Middle Zone | Exit Zone | |
| 2.0 | no | 232 | 272 | 285 | Good Surface, No Cracks |
| 3.0 | no | 230 | 280 | 280 | " |
| 4.0 | no | 230 | 280 | 280 | " |
| 5.0 | no | 220 | 280 | 295 | " |
| 6.0 | yes | 200 | 260 | 280 | " |
| 7.0 | yes | 200 | 260 | 280 | " |

The physical properties of the bars produced in Examples 1 and 2 are given in Table 3, which also gives the properties of a one-inch diameter pultruded bar made with 69% glass roving and a polyester typically used for thick-pultruded products. All property values are in pounds per square inch (psi).

TABLE 3

|  | Example 1 | Example 2 | Typical Prior Art |
|---|---|---|---|
| Flexural Strength | 134,600 | 136,700 | 128,000 |
| Flexural Modulus | $5.6 \times 10^6$ | $6.1 \times 10^6$ | $5.3 \times 10^6$ |
| Tensile Strength | 131,200 | 125,700 | 154,000 |
| Tensile Modulus | $6.1 \times 10^6$ | $6.7 \times 10^6$ | $4.8 \times 10^6$ |
| Compressive Strength | 78,000 | 55,000 | 58,000 |
| Compressive Modulus | $5.9 \times 10^6$ | $6.8 \times 10^6$ | $3.5 \times 10^5$ |

From the data in Tables 1, 2 and 3, it is apparent that the invention pultrusion resins can be pultruded at high speeds to give products having smooth surfaces and no internal or external cracking. Additionally, the data shows that the invention polyester resins give pultruded products having superior physical properties as compared to products made with polyester resins typically employed at the present time.

In production runs at two different pultruders, a pultrusion polyester resin like that of Example 1 was used to: (a) increase the pultrusion speed of a one-inch-diameter rod from 3 feet/minute to 6 feet/minute, and (b) increase the pultrusion speed of a hammer handle from 8 inches/minute to 36 inches/minute.

What is claimed is:

1. In a pultrusion process the improvement which comprises using a polyester resin composition comprising a homogeneous admixture of:
    (A) 40-60 parts of a polyester made by the condensation of reactants consisting essentially of from about 65-85 mole percent of an alpha, beta unsaturated diacid or anhydride, from about 15-35 mole percent of a saturated diacid or anhydride and up to about 110 mole percent of a glycol, the polyester having an alpha, beta unsaturation equivalent weight of about 200-275 and a monomer compatibility of about 25% or less;
    (B) 40-60 parts of a monomer or mixture of monomers copolymerizable with the polyester, the total of (A) and (B) being 100 parts, and giving a polyester resin which when cured has a Barcol hardness of at least 45;
    (C) 4-10 parts of a cellulose acetate butyrate resin that is:
        (1) soluble in the polyester resin;
        (2) causes the admixture when cured to be opaque.

2. The process as in claim 1 wherein the monomer consists essentially of styrene, vinyl toluene or mixtures thereof.

3. The process as in claim 1 wherein the quantity of cellulose acetate butyrate resin is 5-8 parts.

4. The process as in claim 1 wherein the cellulose acetate butyrate resin has a average butyrate content of about 44 percent or higher.

5. The process as in claim 1 wherein there is used 45 to 55 parts of the polyester and 55 to 45 parts of the monomer.

* * * * *